June 29, 1954

S. E. HOWSE 2,682,478

METHOD OF FORMING TELEVISION SCREENS

Filed Sept. 11, 1950

INVENTOR.
Samuel Eric Howse
BY Lyon & Lyon
Attorneys

Patented June 29, 1954

2,682,478

UNITED STATES PATENT OFFICE 2,682,478

METHOD OF FORMING TELEVISION SCREENS

Samuel E. Howse, Glendale, Calif., assignor to Technicolor Motion Picture Corporation, Los Angeles, Calif., a corporation of Maine Application September 11, 1950, Serial No. 184,237

9 Claims. (Cl. 117—17)

This invention relates to television screens and more particularly to improved methods for depositing fluorescent materials on television screens of the non-planar type.

It has heretofore been proposed to employ, particularly for color television, television screens which comprise a multiplicity of projecting groups of contiguous elemental surfaces or facets, the facets of each group being coated with a different type luminescent material to produce, when impacted by a beam of electrons, light of different colors. The selected colors are such that each group of facets will satisfactorily reproduce the corresponding portion of the desired image in its natural color. Screens of this type are described in the patents to Geer, No. 2,480,848 and Goldsmith, No. 2,481,839. As set forth in each of these patents, by employing such a non-planar type screen, color information can be controlled by utilizing the striking angle of the electron beam in the kinescope. For example, the screen may be constructed to contain a plurality of projecting trihedral pyramids, the three contiguous facets of each being coated with materials which will fluoresce respectively to produce light of the three primary colors, red, green and blue. Further, the geometrically corresponding facets of each pyramid are coated with the same material so as to provide three systems of facets, each of which will produce light of one of the primary colors. In place of such three color system, screens have been proposed having projections containing two or four contiguous facets, the geometrically corresponding facets of each being coated with a fluorescent material which will yield light of the proper color so that each group of facets or projection will produce the natural color of the corresponding portion of the desired image.

Regardless of the particular configuration of the screen employed, however, it is necessary for best results that each projection or group of contiguous facets be exceedingly small so that the light produced thereby will merge to form a continuous and blended picture. Since it is necessary to coat each of the contiguous facets of each group with a different luminescent material, the minute size of these facets renders such coating exceedingly difficult. Furthermore, if undesirable loss of color definition is to be avoided, it is necessary that each of the different luminescent materials be deposited only upon the proper system of facets. In accordance with the present invention, a method is provided for selectively coating each of the facets of a non-planar type television screen with the desired fluorescent material and for preventing such material from settling upon undesired facets.

Accordingly, it is the principal object of the present invention to provide a method for coating, with the desired luminescent material, the minute facets of a non-planar type television screen.

It is a further object of this invention to provide a method for selectively coating such facets in such manner that the luminescent materials intended for one system of facets will not settle upon other and undesired facets.

Other objects and advantages of the invention will become apparent and at once suggest themselves to those skilled in the art to which the invention is directed by reading the following specification and claims in connection with the accompanying drawings, wherein:

Fig. 1 schematically illustrates a section of a television screen of the non-planar type constructed of a multiplicity of trihedral projections or pyramids.

Figures 4, 6:
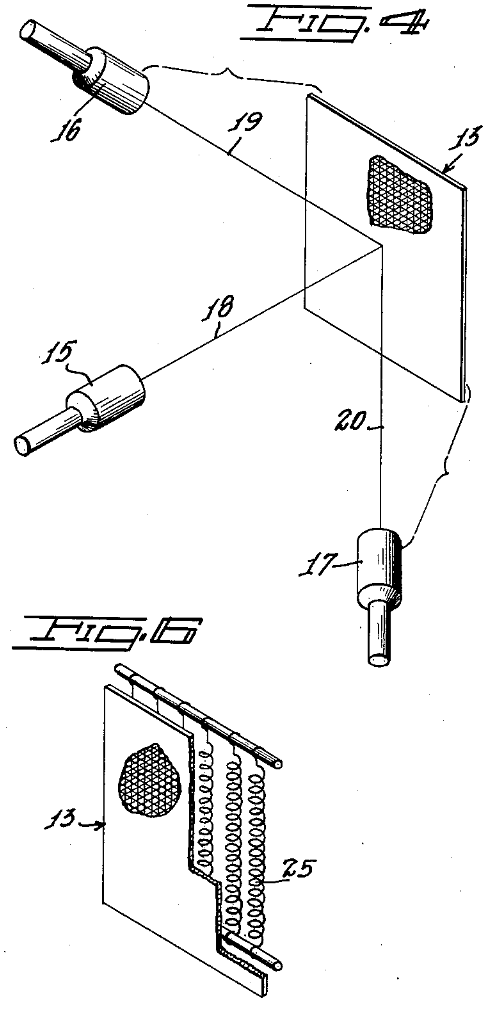
Fig. 4 is a schematic illustration of suitable apparatus employed in selectively discharging the projecting system of facets of the screen in accordance with the present invention.
Figure 5:
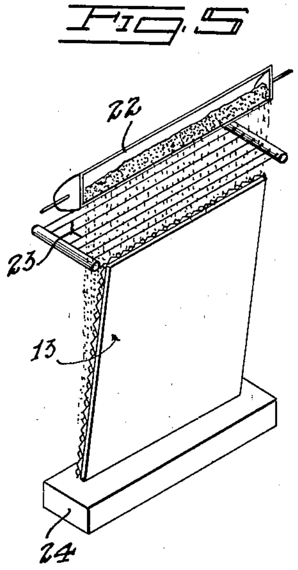

Fig. 5 schematically illustrates suitable apparatus employed for depositing the fluorescent material upon the screen in accordance with the present invention, and Fig. 6 schematically illustrates suitable apparatus employed for heating the screen so as to bind the fluorescent material to the screen in accordance with the present invention.

Figure 1:
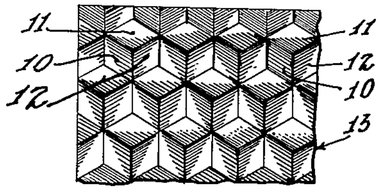
Figure 2:
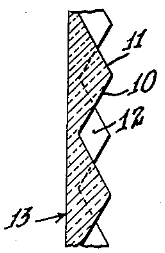
Fig. 2 is an enlarged cross-sectional view of the screen shown in Fig. 1.

Referring to the drawings, Figs. 1 and 2 illustrate a portion of one type of non-planar television screen which, merely for illustration, will be referred to in order to describe the present invention. As seen, the screen consists of a number of projecting trihedrons, each having three contiguous facets 10, 11 and 12 thereon. Each of these facets is coated with a different type fluorescent material so that when impacted by electrons, it will fluoresce to give light of one of the three primary colors. For example, the system of facets 10 may be coated with chromium activated aluminum berylliate or zinc cadmium sulphide activated by silver to give a red luminescent effect; the system 11 may be coated with silver activated zinc sulphide, zinc silicate and zirconium silicate to provide blue luminescent effects, while the system 12 may be activated with alpha-willemite activated with manganese and zinc cadmium sulphide activated with silver to provide the green luminescent effects. The above materials are given merely by way of example, inasmuch as a number of varieties of fluorescent materials which will produce luminescent effects in different colors, are available and are well known to those skilled in the art.

As set forth in the aforesaid Geer and Goldsmith patents, electrons striking the facets 10 will cause luminescence of those surfaces. Further, by so locating the source of such electrons such that the electrons strike the facets substantially normal thereto, they will be shielded by the facets 10 from striking facets 11 and 12. In like manner, electrons striking facets 11 will cause these surfaces only to be illuminated. Similarly, electrons striking facets 12 substantially normal thereto will activate the fluorescent materials on these surfaces only. By providing three electron guns disposed at appropriate angles relative to the screen, the electron stream from one gun will activate only the red fluorescent materials, the electron stream from the second gun will activate only the blue fluorescent materials and the electron stream from the third gun will activate only the green fluorescent materials. In this manner, by properly controlling the three electron guns, an additive color image can be obtained on the screen which will reproduce the natural colors of the subject.

As previously set forth, for best results each of the trihedral elements must be exceedingly small. Under such circumstances, the three facets 10, 11 and 12 of each projecting element are not individually discernible at normal viewing distance, with the result that the additive color effect rather than the individual colors appear to the viewer. The small size of the individual facets 10, 11 and 12 makes the coating of the fluorescent materials upon the proper facets a difficult and expensive operation. The present invention is directed to this problem and provides a simple and inexpensive solution thereto.

In accordance with the invention, a screen 13 is formed which has on one side thereof the desired projections such, for example, as the trihedral pyramids above discussed. The formation of such a screen forms no part of the present invention and will not therefore be described herein in detail. This screen is preferably constructed of a transparent dielectric material such as glass or a suitable plastic, and may be flat or slightly concave with the projecting elements on the concave side.

Figure 3:
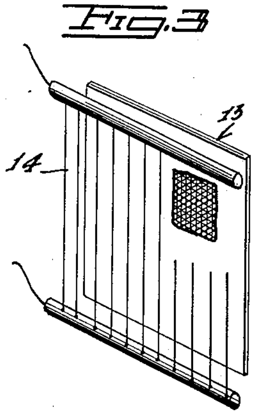
Fig. 3 is a schematic illustration of suitable apparatus employed in applying an electrical charge to the television screen in accordance with the present invention.

The screen 13, after being carefully cleaned and dried, is placed in a desiccated chamber, for example, a large bell jar. Next, the side of the screen on which is located the trihedral projections, hereinafter referred to as the inner side of the screen, is given an overall positive electric surface charge. This can be readily accomplished by exposing the inner side of the screen to a grid 14 of fine wires positively charged to a potential gradient sufficiently high, for example 30 kv./cm., so that a brush discharge occurs. Such a grid is illustrated schematically in Fig. 3. While other methods of applying a positive charge to the screen can be employed, the above, due to its simplicity, is preferred. This method, per se, is known to the art, being quite similar to that used in applying a charge to the transport belt of a Van de Graff electrostatic generator or in charging the image plate in the xerography process of dry printing.

Following the application of the positive electrical charge to the plate, the chamber in which the plate is disposed is evacuated. Next, a beam of electrons is caused to remove the charge selectively from two of the three systems of facets, leaving but a single system charged. The selective removal of charges can be accomplished in the manner illustrated by Fig. 4. Thus, the electron guns 15, 16 and 17 are disposed at a sufficient distance from the screen 13 such that the departure from their respective beams from the normal to the surfaces of the planes toward which they are directed will be minimized. By way of example, electron gun 15 will be disposed in such manner that its beam 18 will strike the facets 10 of the screen 13, the beam 19 of the electron gun 16 will strike the facets 11, and the beam 20 of the electron gun 17 will strike the facets 12. Each electron beam is controlled to scan its respective system of facets. This can be accomplished either by sweeping a very narrow beam in the conventional manner by magnetic or electrostatic deflection, or even physically moving the electron guns themselves, or the electron beam might be broadly focused so as to direct a flood of electrons to the whole projected area of the screen. Suitable sweeping and focusing circuits for these purposes are well known, and it is therefore deemed unnecessary that they be described in detail herein.

The electron guns are utilized to remove the positive charges from two of the systems of facets. Thus, electron gun 15 is first employed to remove the charges from the facets 10. Next, the electron gun 16 is employed to remove the charges from the facets 11. Following this operation, only the facets 12 will retain their positive electrical charge.

The charged facets 12 are next coated with the appropriate fluorescent material in the following manner: Fluorescent material which has been ground to a fine powder is mixed with a binding agent which will fuse at a relatively low temperature to form a glaze which will adhere to the screen 13 and imbed the particles of fluorescent powder. Several types of binding agents have been found suitable for this purpose, for example, fused sodium borate, sodium tripolyphosphate or a low melting temperature powdered glass. To this mixture of the fluorescent powder and binding agent may be added a somewhat more coarsely ground "carrying material" which acts to prevent agglomeration and packing of the fluorescent material and binding agent. This carrying agent may consist of any suitable material, for example, silica sand. The mixture of fluorescent material, binding agent and carrying material is deposited in a suitable trough or boat 22 shown in Fig. 5. Below this is placed the screen 13 which is tipped a few degrees off the vertical. In order to cause the mixture to adhere to the positively charged facets 12, a negative charge is applied to the mixture. A convenient means for applying this charge is illustrated in Fig. 5. As seen, disposed between the screen 13 and the boat 22 is a negatively charged wire grid 23. This grid is charged to a fairly high potential, for example 30 kv./cm., to provide a negative field. The boat 22 is tipped so as to permit the mixture to cascade downwardly through the negative field of the grid 23 onto the screen 13. The mixture, in falling through the electric field of the grid 23, acquires a negative charge and is therefore electrically drawn to and will adhere to the charged surfaces 12. While some surplus material may fall upon uncharged facets, it can be readily blown from such facets by a suitable air jet. If it is desired to regulate the density of the fluorescent material deposited upon the surfaces 12, a simple mechanical vibrator 24 can be employed. The frequency and the strength of the vibrations required to produce the desired density of material can be readily ascertained empirically.

Following the settling of the fluorescent powders upon the charged surfaces 12, the material is bound to these surfaces. This is readily accomplished by heating the screen in the manner illustrated in Fig. 6. As seen, an array of electrically heated filaments 25 is spaced in close proximity to the screen, preferably on the outer side thereof. The filaments will heat the entire screen, thereby fusing the particles of the binding material to form a glaze in which is embedded the fluorescent material particles.

The above described steps complete the coating of the surfaces 12 with the appropriate fluorescent material. The surfaces 10 and 11 are coated in an identical manner. Thus, surface 10 is selectively positively charged in the manner heretofore described for the surfaces 12, the appropriate fluorescent materials are cascaded through the negatively charged grid 23 onto the screen 13, and after the material is blown from the undesired surfaces, the material is bound to the surfaces 10 by heating the screen 13. The appropriate fluorescent material is applied to the surfaces 11 in like manner.

After the screen has been coated, it is either mounted inside the enclosing envelope of the kinescope or utilized to form the end wall thereof. The details of such constructions are well known and are not therefore described herein.

As above described, the selective coating of the facets 10, 11 or 12 with the desired fluorescent material is accomplished by selectively positively charging each system of facets. This is accomplished in the form of the invention heretofore discussed by applying an overall positive charge to the screen, and selectively removing that charge from two of the three systems of facets by means of properly disposed electron beams.

An alternative method for applying such a selective charge will now be described. The inner side of the screen 13 is first coated with a photoemissive mosaic. Next, instead of a beam of electrons, the screen is illuminated by a collimated beam of light. The source of the beam of light is so oriented that the beam will, in a manner similar to that previously described, strike but a single system of facets. The group of facets so illuminated, due to the photo-emissive character of the coating thereon and the consequent electron emission, acquires a positive charge. The appropriate fluorescent material is then applied to coat this system of positively charged facets as before. The process is repeated to coat each system of facets with its appropriate fluorescent material.

While the method for selectively charging and coating the different projecting groups of surfaces of non-planar type television screens has been described herein with reference to a screen formed of a multiplicity of trihedrons, it is to be understood that the method is not so limited and can be employed to coat the desired fluorescent materials on other types of non-planar screens such as are illustrated in the aforesaid patents to Geer and Goldsmith.

It is to be understood that the form of the invention shown and described is to be taken as a preferred example of the same and that various modifications thereof may be resorted to without departing from the spirit of the invention or the scope of the appended claims.

I claim:

1. In a method of selectively coating with fluorescent material a non-planar television screen constructed of a transparent dielectric material and of the type having at least two systems of projecting and geometrically corresponding facets and in which each system of facets is coated with a different type fluorescent material, the steps of placing the screen in a desiccated chamber, applying to the screen an over-all positive electrical charge, evacuating the said chamber, selectively removing the positive electrical charge from all but one of the said systems of facets by impacting said systems of facets with electron beams, depositing the desired fluorescent material upon the charged system of facets by negatively charging the said material and cascading it upon the said screen, and repeating each of the enumerated steps for each system of facets.

2. A method in accordance with claim 1 including the steps of removing by blowing the said fluorescent material from the remaining systems of facets.

3. A method in accordance with claim 2 and including the steps of binding the proper fluorescent materials to each system of facets by heating the said screen after the said fluorescent material has been removed from the remaining systems of facets.

4. In a method of selectively coating with fluorescent material a non-planar television screen of the type having at least two systems of projecting and geometrically corresponding facets and in which each system of facets is coated with a different type fluorescent material, the steps of coating the systems of facets with a photoemissive material, placing the screen in a desiccated chamber, impinging one of said systems of facets with a beam of light thereby imparting to said system a positive electrical charge, depositing the desired fluorescent material upon the charged system of facets by negatively charging the said material and cascading it upon the said screen, and repeating each of the enumerated steps for each system of facets.

5. A method in accordance with claim 4 including the steps of removing by blowing the said fluorescent material from the remaining system of facets.

6. A method in accordance with claim 5 including the steps of removing by blowing the said fluorescent material from the remaining system of facets.

7. In the manufacture of a television screen constructed of a transparent dielectric material of the type having at least two systems of projecting and geometrically corresponding facets and in which each system of facets is coated with a different type fluorescent material, the method of successively coating each of the systems of facets with the particular fluorescent material intended therefor, comprising the steps of placing the screen in a desiccated chamber, applying an electrical charge to one of the said systems of facets, applying an electrical charge of opposite polarity to the particular fluorescent material intended therefor and depositing the said fluorescent material upon the said system of facets, each of the steps being repeated for each system of facets.

8. In the manufacture of a television screen constructed of a transparent dielectric material of the type having at least two systems of projecting and geometrically corresponding facets and in which each system of facets is coated with a different type fluorescent material, the method of successively coating each of the systems of facets with the particular fluorescent material intended therefor, comprising the steps of placing the screen in a desiccated chamber, applying an electrical charge to one of the said systems of facets, applying an electrical charge of opposite polarity to the particular fluorescent material intended therefor and depositing the said fluorescent material upon the said system of facets and removing by blowing the said fluorescent material from the remaining systems of facets, each of the steps being repeated for each system of facets.

9. In the manufacture of a television screen constructed of a transparent dielectric material of the type having at least two systems of projecting and geometrically corresponding facets and in which each system of facets is coated with a different type fluorescent material, the method of successively coating each of the systems of facets with the particular fluorescent material intended therefor, comprising the steps of placing the screen in a desiccated chamber, applying an electrical charge to one of the said systems of facets, applying an electrical charge of opposite polarity to the particular fluorescent material intended therefor and depositing the said fluorescent material upon the said system of facets and removing by blowing the said fluorescent material from the remaining systems of facets and thereafter binding the said fluorescent material upon the said system of facets by heating said screen, each of the steps being repeated for each system of facets.

References Cited in the file of this patent

UNITED STATES PATENTS

| Number | Name | Date |
|---|---|---|
| 2,297,691 | Carlson | Oct. 6, 1942 |
| 2,433,116 | Greenbowe et al. | Dec. 23, 1947 |
| 2,438,561 | Kearsley | Mar. 30, 1948 |
| 2,481,839 | Goldsmith | Sept. 13, 1949 |